United States Patent [19]
Tokiwa et al.

[11] Patent Number: 5,490,752
[45] Date of Patent: Feb. 13, 1996

[54] BAR STORAGE APPARATUS

[75] Inventors: Toru Tokiwa; Takayoshi Hasegawa, both of Hadano, Japan

[73] Assignee: Amada Company, Limited, Isehara, Japan

[21] Appl. No.: 396,610

[22] Filed: Mar. 1, 1995

Related U.S. Application Data

[62] Division of Ser. No. 73,063, Jun. 8, 1993, Pat. No. 5,427,490.

[30] Foreign Application Priority Data

| | | | |
|---|---|---|---|
| Jun. 9, 1992 | [JP] | Japan | 4-149475 |
| Jun. 18, 1992 | [JP] | Japan | 4-159238 |
| Oct. 27, 1992 | [JP] | Japan | 4-288414 |

[51] Int. Cl.$^6$ .................................................. B21D 43/20
[52] U.S. Cl. .................... 414/280; 414/225; 414/286; 414/745.7; 414/746.7
[58] Field of Search ................................ 414/277, 280, 414/286, 745.1, 746.7, 746.7, 225

[56] References Cited

U.S. PATENT DOCUMENTS

| | | |
|---|---|---|
| 3,426,922 | 2/1969 | Massey . |
| 3,809,259 | 5/1974 | Pipes ........................... 414/280 |
| 4,077,532 | 3/1978 | Bryan . |
| 4,362,454 | 7/1982 | Kripzak ....................... 414/280 |
| 4,642,014 | 2/1987 | Saarinen . |
| 5,120,178 | 6/1992 | Ito ............................... 414/225 |

FOREIGN PATENT DOCUMENTS

| | | |
|---|---|---|
| 0195844 | 10/1986 | European Pat. Off. . |
| 0206992 | 12/1986 | European Pat. Off. . |
| 0281955 | 9/1988 | European Pat. Off. . |
| 81874 | 5/1984 | Japan ........................... 414/277 |
| 48802 | 3/1985 | Japan ........................... 414/277 |
| 145036 | 7/1986 | Japan ........................... 414/277 |
| WO921291 | 8/1992 | WIPO . |

OTHER PUBLICATIONS

European Search Report (Dated May 25, 1994).

*Primary Examiner*—Margaret A. Focarino
*Assistant Examiner*—Thomas J. Brahan
*Attorney, Agent, or Firm*—Wigman, Cohen, Leitner & Myers

[57] ABSTRACT

A bar storage apparatus comprises: a shelf frame (19) provided with a plurality of pallet accommodating shelves (17) each for movably accommodating a pallet (15) on which a plurality of bars are mounted; an elevator device (23) disposed on one side of the shelf frame so as to be movable up and down and provided with a traverser (21) for moving each pallet into and from each of the pallet accommodating shelves; and a bar supplying device (25) for supplying a bar, mounted on the pallet moved from the pallet accommodating shelf and further located at a predetermined position by the elevator device, to a bar processing machine (3). The bar storage apparatus can store a great number of bars of various kinds and various dimensions, select any required bars from a great number of bars, and supply the selected bars to a bar processing machine easily and quickly.

6 Claims, 16 Drawing Sheets

BAR STORAGE APPARATUS

This is divisional of application Ser. No. 08/073,063 filed on Jun. 8, 1993, now U.S. Pat. No. 5,427,490.

BACKGROUND OF THE INVENTION

1. Field of the Invention

The present invention relates to a bar storage apparatus for storing bars to be supplied to a bar processing machine such as a sawing machine, and more specifically to a bar storage apparatus capable of storing a great number of bars of various sorts and further of facilitating conveyance of any required bars into and out of the bar processing machine.

2. Description of the Prior Art

As the prior arts related to the present invention, there are such documents as U.S. Pat. No. 4,362,454; Laid-Open German Patent No. DE 4,018,139-A1; and PCT/JP92/00061 (filed by the same Applicant).

In prior art bar storage apparatuses for storing various bars to be supplied to the bar processing machine such as the sawing machine, as disclosed in the above-mentioned documents, a roller conveyer is arranged on the rear side of the bar processing machine; and a chain conveyer is disposed along a direction perpendicular to the bar feeding direction of the roller conveyer; and bars to be processed are mounted on the chain conveyer in accordance with the order of processing.

In the above-mentioned construction, when the chain conveyer is driven, bars mounted on the chain conveyer are conveyed in sequence onto the roller conveyer, and further into the bar processing machine by the roller conveyer, so that it is possible to realize an unmanned bar processing system.

In the prior art construction as described above, however, since bars must be mounted previously on the chain conveyer in sequence, and further the arrangement of bars is of two-dimensional way (which is because bars are arranged on the chain conveyer), there exists a problem in that it is difficult to store a great number of bars.

To overcome the above-mentioned problem, a construction for storing bars in three-dimensional way has been proposed.

In the prior art construction for storing bars in three-dimensional way, however, since bars are directly mounted on each of a plurality of shelves, bars must be conveyed into and out of the respective shelves by use of a conveying machine such as a ceiling crane or a gantry crane. Consequently, in the above-mentioned prior art construction, although a great number of bars can be stored, there exists another problem in that the whole construction is large in size and further it take a relatively long time to convey bars to and from the bar processing machine.

SUMMARY OF THE INVENTION

With these problems in mind, therefore, it is the first object of the present invention to provide a bar storage apparatus capable of storing a great number of bars of various kinds, of selecting any required bars from a great number of bars, and of easily supplying the selected bars to a bar processing machine.

The second object of the present invention is to provide a bar storage apparatus of capable of supplying bars to a bar processing machine quickly.

To achieve the above-mentioned objects, the present invention provides a bar storage apparatus comprising: a shelf frame provided with a plurality of pallet accommodating shelves each for movably accommodating a pallet on which a plurality of bars are mounted; an elevator device disposed on one side of said shelf frame so as to be movable up and down and provided with a traverser for moving each pallet into and from each of the pallet accommodating shelves; and a bar supplying device for supplying a bar, mounted on the pallet moved from the pallet accommodating shelf and further located at a predetermined position by said elevator device, to a bar processing machine.

The pallet preferably has a lattice structure.

Further, the pallet is preferably provided with a plurality of vertical rollers for partitioning bar mounting positions, and said bar supplying device is slightly inclined to shift the bar into contact with the vertical rollers. Alternatively, the pallet may be formed with grooves each for stably supporting the bar.

Yet further, the bar supplying device is preferably provided with a plurality of bar feeding rollers for lifting a bar relative to the pallet located at the predetermined position and further for feeding the bar in a longitudinal direction of the bar, each of said bar feeding rollers being formed with a circumferential groove for guiding the bar in the longitudinal direction thereof.

Still further, a pallet support table is preferably disposed on one side of said shelf frame opposite to the other side on which said elevator device is disposed, to support the pallet moved by said elevator device, the pallet support table being provided with a second traverser for moving the pallet.

Additionally, the bar supplying device preferably includes a bar lifting device for lifting a bar on the pallet located at the predetermined position, and a bar feeding device for receiving the bar lifted by said bar lifting device and further feeding the received bar in a longitudinal direction of the bar, wherein the bar supplying device includes a plurality of push rods aligned in a longitudinal direction of the bar to be supplied and spaced from each other by a suitable distance, each push rods being adapted to be moved in the vertical direction independently of each other.

Furthermore, the bar supplying device preferably includes a bar lifting device for lifting the bar mounted on the pallet located at the predetermined position, a bar conveying device for receiving the bar lifted by said bar lifting device and further conveying the received bar in a direction perpendicular to bar longitudinal direction, and a bar feeding device for receiving the bar from said bar conveying device and further feeding the received bar in the bar longitudinal direction, wherein the bar conveying device includes a first bar supporting portion for supporting a new bar, and a second bar supporting portion for supporting a residual bar.

DETAILED DESCRIPTION OF THE PREFERRED EMBODIMENTS

To facilitate understanding of the present invention, an overall construction of a cutting processing system to which a bar storage apparatus according to the present invention is applied will be first described hereinbelow.

Figure 1:
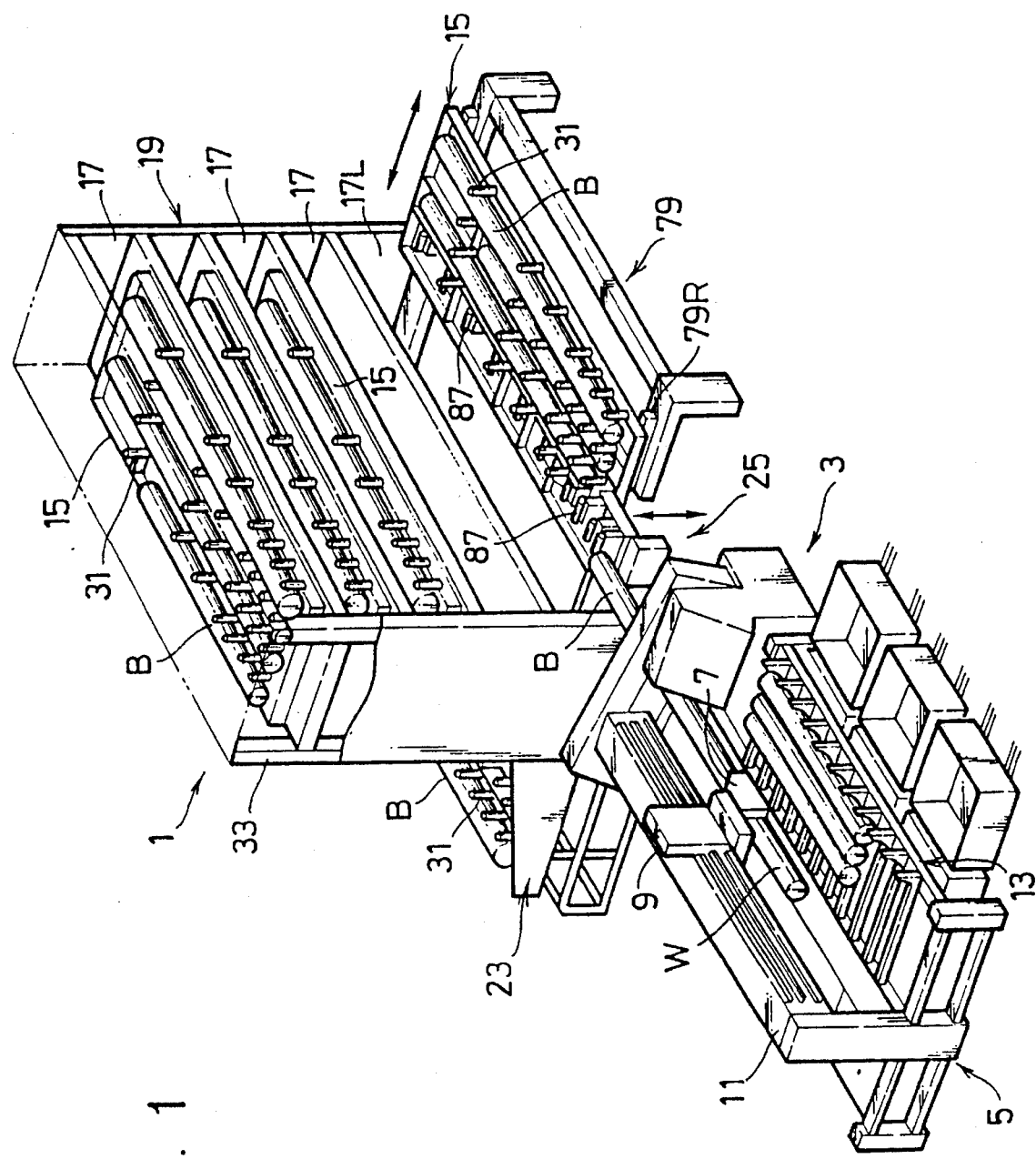
FIG. 1 is a perspective view showing an overall cutting processing system including the bar storage apparatus according to the present invention.

With reference to FIG. 1, the bar storage apparatus 1 of the present invention is disposed on the rear side of a bar processing machine 3 such as a band sawing machine. On the front side of this bar processing machine 3, a cut-off workpiece conveying apparatus 5 is disposed to convey workpieces W cut off by the bar processing machine 3 from the cutting position of the bar processing machine 3 to the front side.

The bar processing machine 3 is an ordinary well-known band sawing machine or a circular sawing machine, so that any detailed descriptions thereof are omitted.

The cut-off workpiece conveying apparatus 5 is provided with such functions as to convey the cut-off workpieces W in the forward direction and further to sort and arrange the cut-off workpieces W according to the shapes and the dimensions thereof.

To achieve the above-mentioned functions, in the cut-off workpiece conveying apparatus 5, a carriage 9 provided with a work clamp 7 for clamping the cut-off workpieces W is disposed along a guide frame 11 so as to be movable to and fro in the front and rear direction. Further, on one side of the passage along which the carriage 9 is moved to and fro, a stock table 13 is arranged to store the cut-off workpieces W temporarily.

Therefore, the cut-off workpieces W cut off by the bar processing machine 3 are conveyed in the forward direction and further stored temporarily on the stock table 13 according to the shapes and dimensions of the cut-off workpieces W.

The cut-off workpieces W arranged on the stock table 13 are appropriately carried to another machine tool such as a lathe for the succeeding process.

Further, since being well known, the cut-off workpiece conveying apparatus 5 is not described in detail herein.

As understood above, In the above-mentioned cutting processing system, it is possible to automatize the bar material cutting processing, by supplying various bar materials automatically to the bar processing machine 3 and further by storing the cut-off processed bars automatically as occasion demands, thus enabling the labor saving in various bar material cutting processing.

In the cutting processing system as described above, the bar storage apparatus of the present invention is so constructed as to store a great number of bars of various kinds and various dimensions to be supplied to the bar processing machine 3, to supply any required bars from the storage position to the bar processing machine 3, and further to return the residual bars to the storage position.

Figure 2:
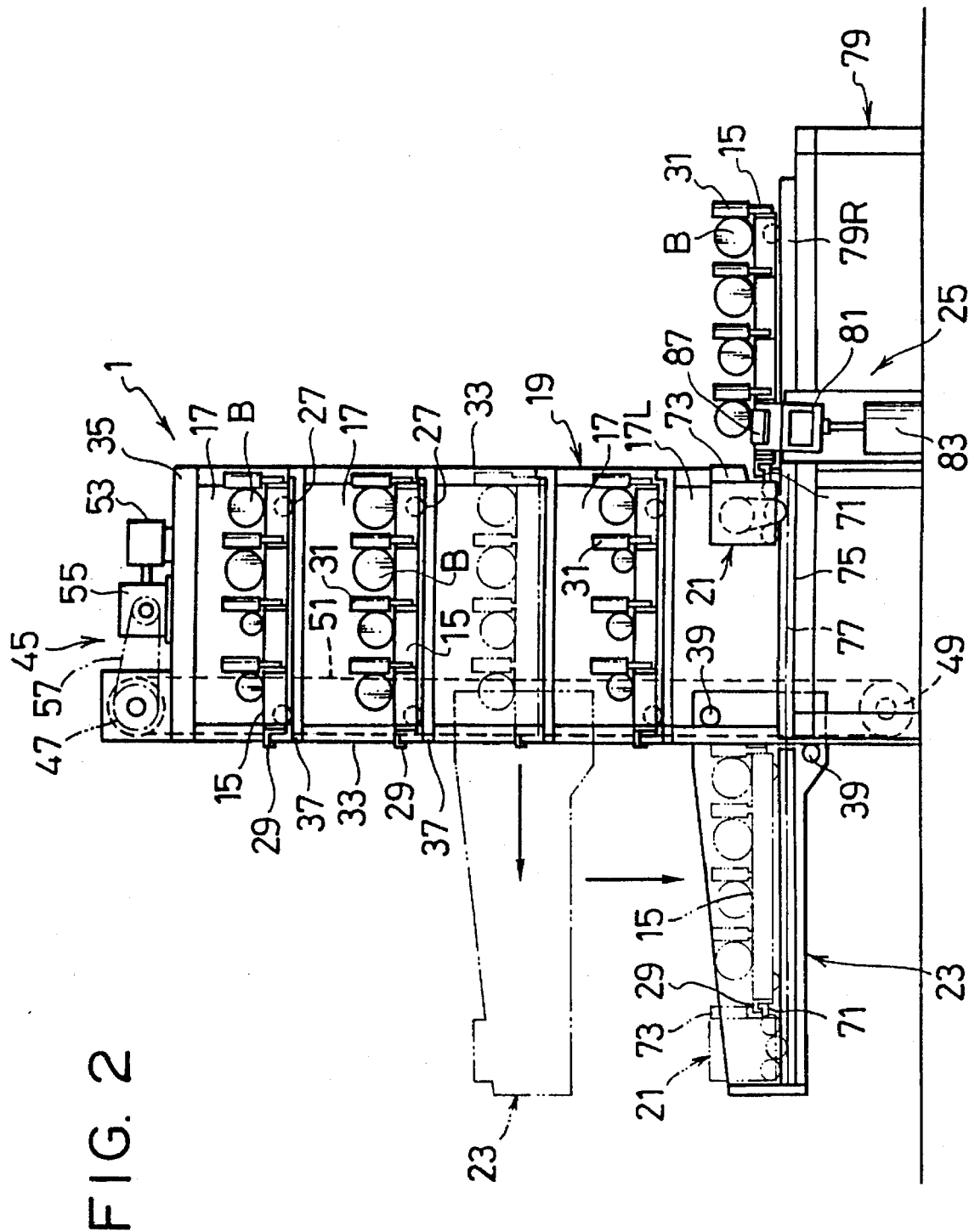
FIG. 2 is a front cross-sectional view showing a first embodiment of the bar storage apparatus of the present invention.

In more detail, with reference to FIG. 2, the bar storage apparatus 1 is composed roughly of a shelf frame 19, an elevator device 23 and a bar supplying device 25. The shelf frame 19 is provided with a plurality of pallet accommodating shelves 17 each for removably accommodating a pallet 15 on which a plurality of elongate bars B (including the shortened residual bars) are mounted. An elevator device 23 is disposed on one side of the shelf frame 19 so as to be movable up and down in the vertical direction and provided with a traverser 21 for moving the pallet 15 to and fro horizontally relative to the pallet accommodating shelf 17. The bar supplying device 25 supplies any required bar B arranged on the pallet 15 pulled out of the pallet accommodating shelf 17 and located at a predetermined position by the elevator device 23, to the bar processing machine 3.

Figure 3:
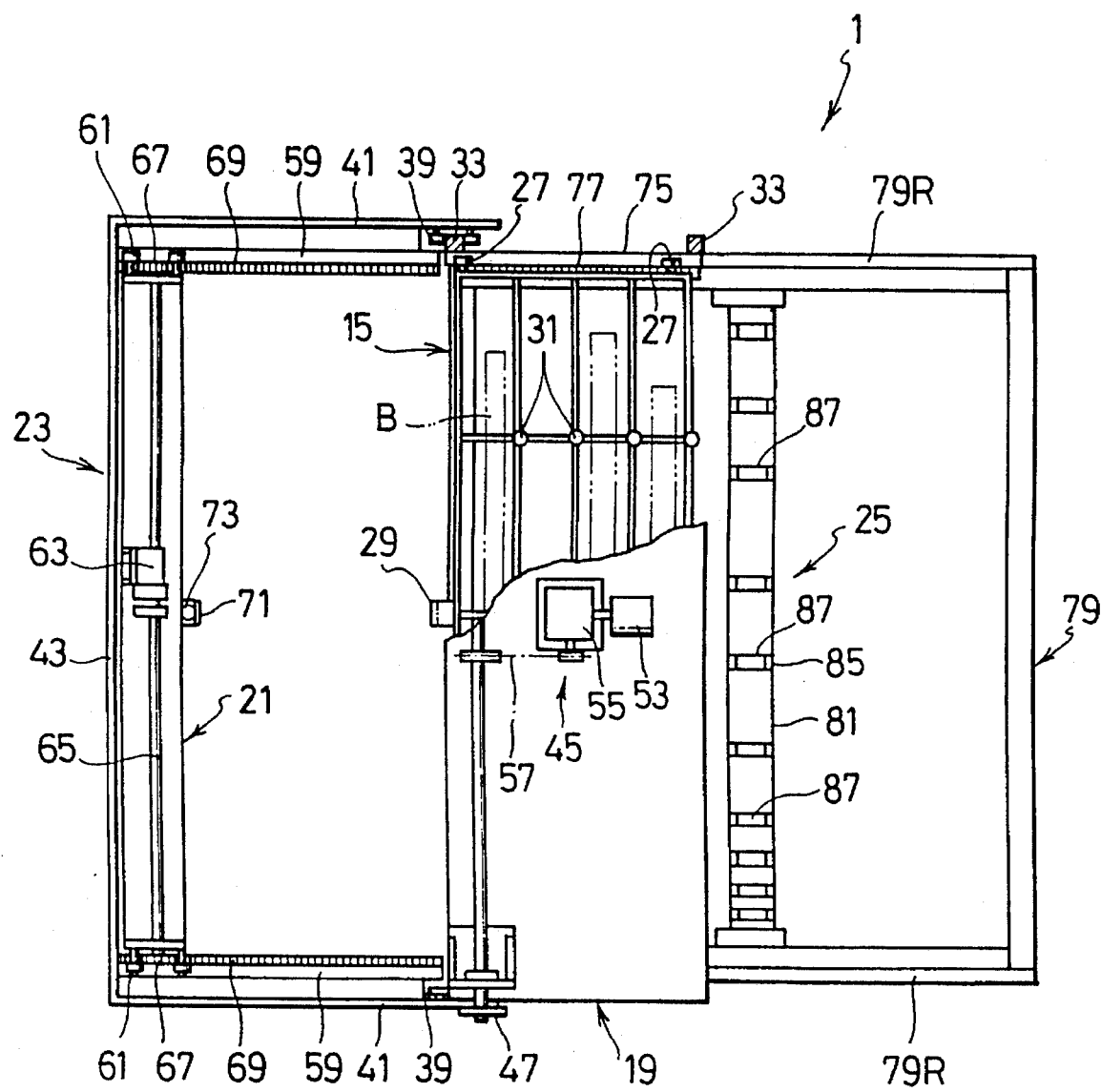
FIG. 3 is a plane view showing the first embodiment of the bar storage apparatus shown in FIG. 1.

As shown in FIGS. 1 to 3, the pallet 15 is formed into an elongate lattice structure or shape extending in the front and rear direction by combining belt-shaped plates. On both sides of the longitudinal direction of the pallet 15, a plurality of rollers 27 are rotatably arranged to move the pallet 15 smoothly.

Further, on one side of the right and left direction of the pallet 15, a hook 29 engageable from below is provided. In addition, on the upper surface of the pallet 15, a plurality of vertical partition rollers 31 are arranged to partition the bar mounting space into plural bar mounting sections in the transverse direction (perpendicular to the longitudinal direction of bars).

The shelf frame 19 is of parallelepiped structure constructed by a plurality of upright columns 33 standing at the corner portions of the base and a plurality of horizontal connecting beams 35 for connecting the respective upright columns 33. Further, the pallet shelf 17 is partitioned into a plurality of vertical stages by a plurality of pallet support rails 37 for connecting the respective upright columns 33 in the right and left direction.

To move each of the pallets 15 into and out of each of the pallet accommodating shelves provided for the shelf frame 19, the elevator device 25 is disposed on the left side of the shelf frame 19 so as to be movable up and down.

As shown In FIG. 3, the elevator device 23 is of rectangular shape formed by connecting two front and rear elevator bases 41 by a connecting member 43. The two front and rear elevator bases 41 are guided in the vertical direction by a plurality of guide rollers 39 rotatable along the upright columns 33 of the shelf frame 19.

An elevator operating device 45 is disposed on the upper portion of the shelf frame 19, in order to move the elevator device 23 in the vertical direction along the upright columns 33 of the shelf frame 19, as shown in FIG. 2

In more detail, a drive sprocket 47 is rotatably attached to the upper portion of the shelf frame 19, and a driven sprocket 49 is rotatably attached to the lower portion of the shelf frame 19. Further, a loop-shaped chain 51 linked with the elevator device 23 is reeled around the drive sprocket 47 and the driven sprocket 49, respectively.

An elevator motor 53 and a reduction gear 55 such as a worm reduction gear are mounted on the upper portion of the shelf frame 19. The elevator motor 53 and the reduction gear 55 are linked by an endless chain 57.

In the above-mentioned structure, when the elevator motor 53 is driven, the drive sprocket 47 is rotated in the forward and reverse directions through the reduction gear 55 and the endless chain 57, so that the elevator device 23 is moved up and down by the chain 51 in the vertical direction along the upright columns 33.

The elevator device 23 can be easily stopped at a height position corresponding to the respective pallet accommodating shelf 17 of the shelf frame 19 as follows:

For instance, appropriate sensors (not shown) or dogs are attached at the respective positions of the respective pallet accommodating shelves 17 of the shelf frame 19. Further, the similar dog or sensor is attached on the elevator device 23 in such a way that the vertical motion of the elevator device 23 can be stopped when the sensor is operated by the dog.

Further, alternately, it is also possible to mount a rotation detector (not shown) such as a pulse encoder, for instance on the drive sprocket 47 or the elevator motor 53. In this case, when the rotation detector detects the vertical position of the elevator device 23, that is, when the elevator device 23 is moved to a height corresponding to any required pallet accommodating shelf 17, the vertical motion of the elevator device 23 is stopped automatically.

In other words, it is possible to adopt various methods of stopping the elevator device 23 at any required vertical positions corresponding to the required pallet accommodating shelves of the shelf frame 19.

The traverser 21 for pulling out the pallet 15 from the pallet accommodating shelf 17 to the elevator device 23 and further for returning the pallet 15 from the elevator device 23 to the pallet accommodating shelf 17 can be constructed as follows:

As shown in FIG. 3, the traverser 21 is formed into a long shape extending in the front and rear direction. On both sides of the longitudinal direction of the traverser 21, a plurality of guide rollers 61 are rotatably arranged so as to be guided by two guide rails 59 attached to the elevator device 23.

Further, a rotary shaft 65 driven by a motor 63 is provided for the traverser 21 so as to extend in the front and rear direction. Two pinions 67 are attached to both ends of the rotary shaft 65. The two pinions 67 are in mesh with two racks 69 provided for the elevator device 23 so as to extend in parallel to the guide rails 56, respectively.

Accordingly, when the motor 63 is driven, the traverser 21 can be moved to and fro along the guide rails 59.

The traverser 21 is provided with a hook 71 movable up and down so as to be engaged with or disengaged from the hook 29 of the pallet 15. In more detail, an actuator 73 such as an air cylinder is mounted on the traverser 21 to move the hook 71 up and down. Therefore, when this actuator 73 is actuated, the hook 71 can be moved up and down into engagement or disengagement from the hook 29 of the pallet 15.

By the construction as described above, after the elevator device 23 has been located at any height position corresponding to the required pallet accommodating shelf 17, the motor 63 is driven to move the traverser 21 close to the pallet 15 in the pallet accommodating shelf 17; the actuator (cylinder) 73 is actuated to engage the hook 71 of the traverser 21 with the hook 29 of the pallet 15; and then the motor 63 is driven in the reverse direction to return the traverser 21 to the original position, so that it is possible to move any given pallet 15 from any required pallet accommodating shelf 17 onto the elevator device 23.

As understood already, it is of course possible to return the pallet 15 from the elevator device 23 to any required pallet accommodating shelf 17.

As described above after the required pallet 15 has been pulled out from the pallet accommodating shelf 17 of the shelf frame 19 onto the elevator device 23 and further moved down at the lowest position as shown in FIG. 2, the bar supplying device 25 is used to supply any required bar B on the pallet 15 to the bar processing machine 3. As shown in FIG. 2, the bar supplying apparatus 25 is disposed on the right side of the shelf frame 19.

In FIG. 2, since the elevator device 23 is disposed on the left side of the shelf frame 19 and further the bar supplying device 25 is disposed on the right side of the shelf frame 19, the pallet 15 on the elevator device 23 must be moved to the bar supplying device 25.

Therefore, a pallet passing shelf 17L is formed at the lowermost position of the shelf frame 19, to pass the pallet 15 therethrough in the right and left direction in FIG. 2. In more detail, the pallet passing shelf 17L is provided with two guide rails 75 and two racks 77 (as shown in FIG. 3) operationally connectable to the guide rails 59 and the racks 69 of the elevator device 23, respectively, when the elevator device 23 is positioned at the same height as the pallet passing shelf 17L.

Accordingly, it is possible to move the traverser 21 from the elevator device 23 through the pallet passing shelf 17L, so that the pallet 15 can be moved through the pallet passing shelf 17L.

Further, in order to support the pallet 15 moved from the elevator device 23 through the pallet passing shelf 17L, a pallet support table 79 is installed on the right side of the shelf frame 19 of frame structure, as shown in FIG. 2. The pallet support table 79 is provided with two guide rails 79R operationally connectable to the two guide rails 75 of the pallet passing shelf 17L, as shown also in FIG. 3.

As shown in FIG. 2, the bar supplying device 25 is disposed within the pallet support table 79, In order to supply the bar B mounted on the pallet 15 supported on the pallet support table 79 to the bar processing machine 3.

That is, as shown in FIG. 1, the bar supplying device 25 is installed on the rear side of the bar processing machine 3 so that the bar B can be directly supplied to the bar processing machine 3.

Figure 4:
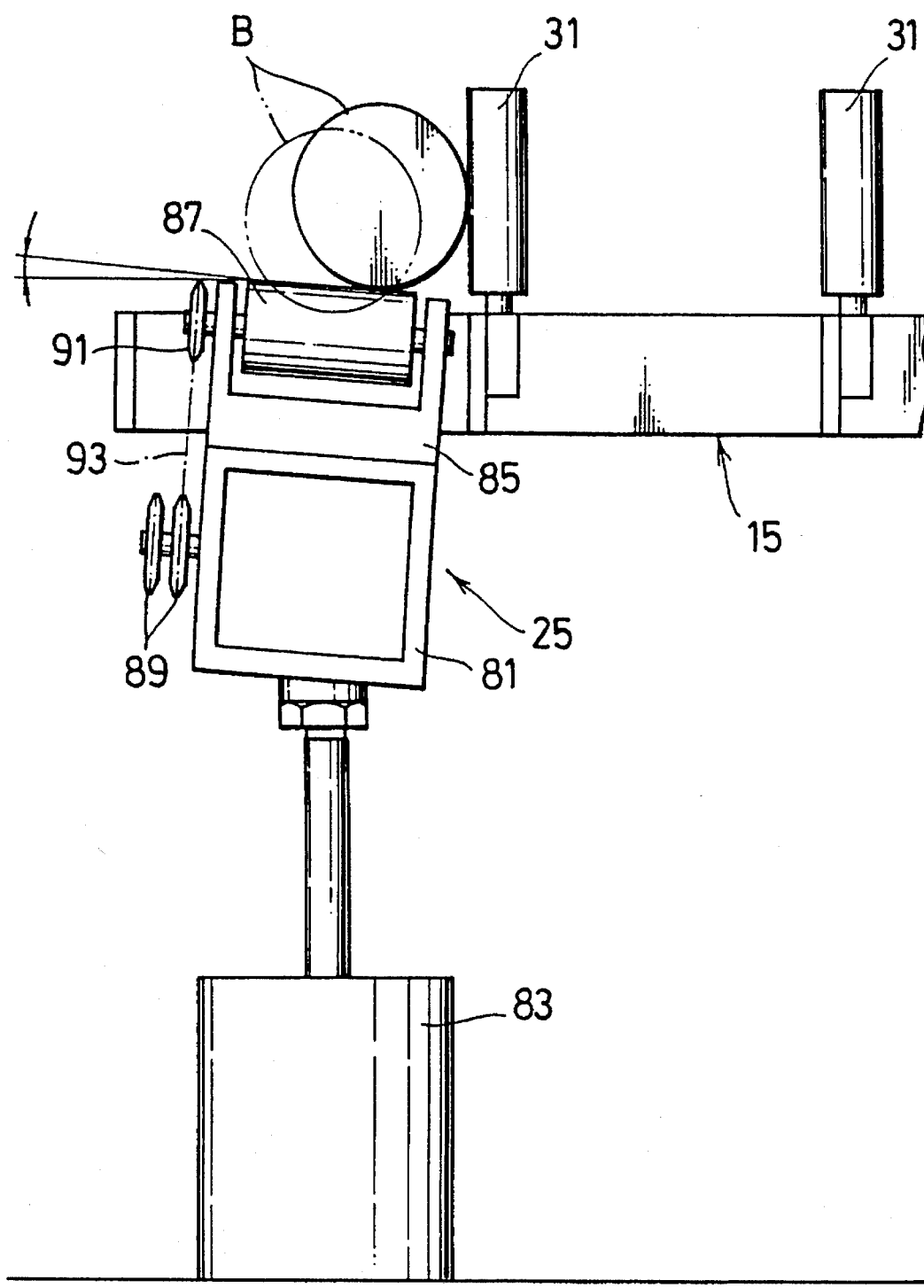
FIG. 4 is an enlarged view showing the bar supplying device of the bar storage apparatus shown in FIG. 1.

In more detail, with reference to FIG. 4, the bar supplying device 25 is provided with a lifting frame 81 extending in the front and rear direction (the supply direction of the bar B).

The lifting frame 81 can be moved up and down by an appropriate number of lifting cylinders 83 arranged in the bar supply direction. On the upper surface of the lifting frame 81, a plurality of vertical brackets 85 which can pass through the partitions of the pallet 15 of lattice structure in the vertical direction are arranged at regular intervals. Further, a bar feeding roller 87 for lifting and further feeding the bar B on the pallet 15 in the front and rear direction is rotatably provided at the upper portion of each of the vertical brackets 85.

In more detail, as shown in FIG. 4, the lifting frame 81 is provided with a plurality of chain sprockets 89 linked with a bar feeding motor (not shown). These sprockets 89 are linked with a sprocket 91 attached to the bar feeding roller 87 via a chain 93. Further, the bar feeding roller 87 is inclined slightly at an appropriate angle as shown in FIG. 4.

Accordingly, when the lifting cylinders 83 are actuated to move the lifting frames 81 upward respectively, the bar B on the pallet 15 can be moved up by the bar feeding rollers 87 of the respective lifting frames 81. Here, since the bar feeding roller 87 is inclined slightly, the bar B moved up can be supported by the bar feeding rollers 87 and the partition rollers 31 vertically disposed on the pallet 15.

As described above, when the bar B is being pushed up by the bar feeding rollers 87, and the bar feeding motor is driven to rotate the bar feeding rollers 87, the bar B is fed and supplied toward the bar processing machine 3.

As understood already, in this embodiment, it is possible to select any required bar B on the pallet 15 and further to supply the selected bar B to the bar processing machine 3, by adjusting the position of the pallet 15 relative to the bar supplying device 25 in the right and left direction in FIG. 2. Further, it is also possible to return a residual bar processed by the bar processing machine 3 onto the pallet 15 for storage again.

Further, when the bar B on the pallet 15 is being processed by the bar processing machine 3 after having been supplied, it is possible to return the traverser 21 onto the elevator device 23 by disengaging the hook 71 of the traverser 21 from the hook 29 of the pallet 15.

Therefore, when the bar B supported by the pallet 15 on the pallet support table 79 is being processed, it is possible to pull out an empty pallet 15, for instance from an appropriate pallet accommodating shelf 17 onto the elevator device 23 and then lower the elevator device, in order to replenish the empty pallet 15 with new bars. In this way, it is possible to prepare, in the shelf frame 19, the bars B to be processed next.

As described above, in the first embodiment 1 of the bar storage apparatus of the present invention, a great number of bars of various kinds can be stored; any required bars can be selected and supplied to the bar processing machine 3 automatically; and further the residual bar processed by the bar processing machine 3 can be stored again. In addition, after the pallet 15 has been moved onto the pallet support table 79 and further any required bar B has been supplied to the bar processing machine 3, the shelf frame 19 can be replenished with new bars B during a processing being effected in the bar B, thus enabling the automatization and the labor saving of the bar processing.

Figure 5:
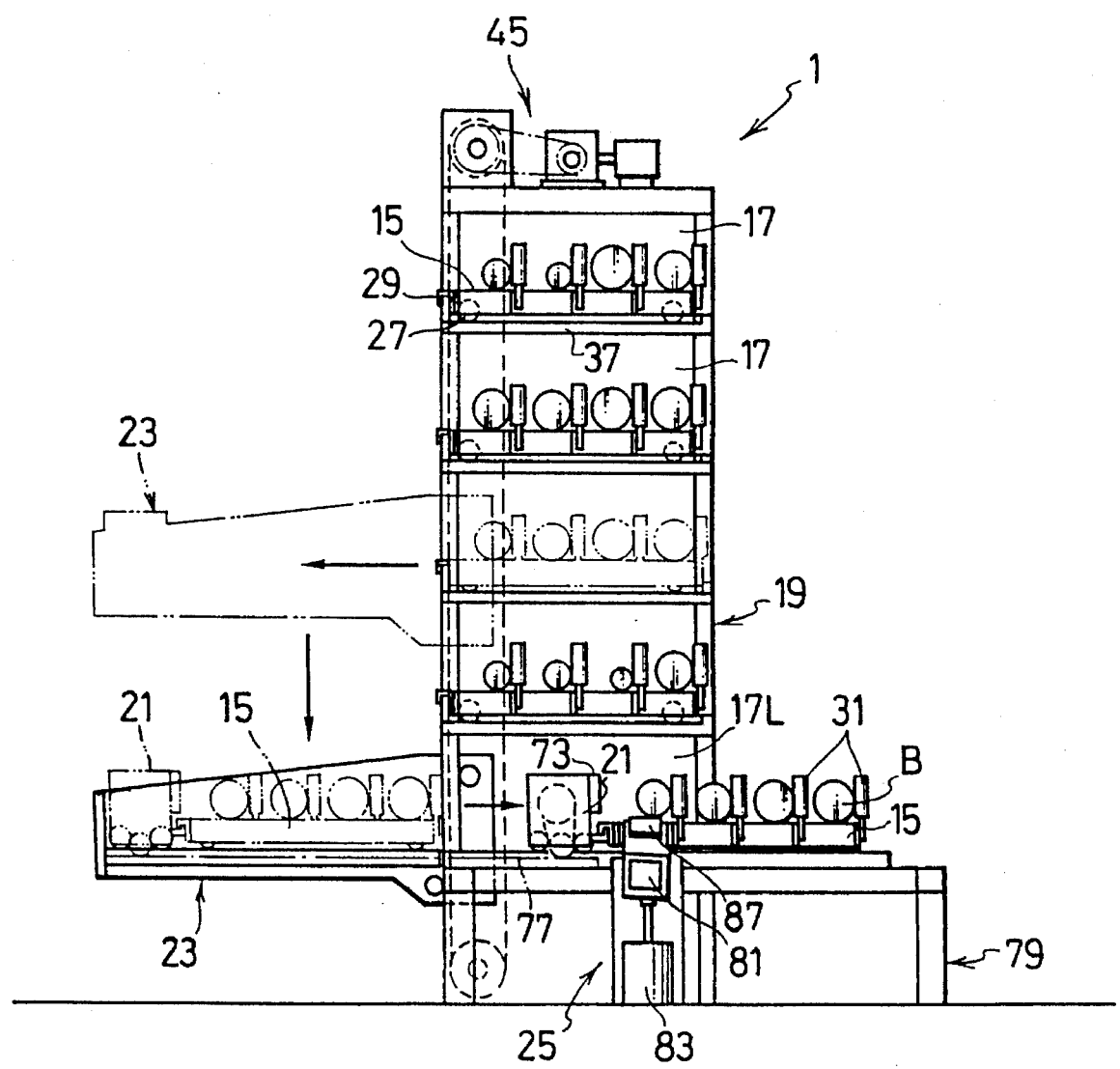
FIG. 5 is a front cross-sectional view showing a second embodiment of the bar storage apparatus of the present invention.

With reference to FIG. 5, the second embodiment of the bar storage apparatus according to the present invention will be described hereinbelow. In this second embodiment, the bar supplying device 25 is arranged inside the shelf frame 19 so as to correspond to the bar processing machine 8. Since the construction other than above is the same as with the case of the first embodiment, the same reference numerals have been retained for the similar parts or elements which have the same functions, without repeating any detailed description thereof.

In this second embodiment, since the bar supplying device 25 is installed inside the shelf frame 19, it is possible to reduce the size of the overall system construction and thereby to reduce the space necessary therefor.

Figure 6:
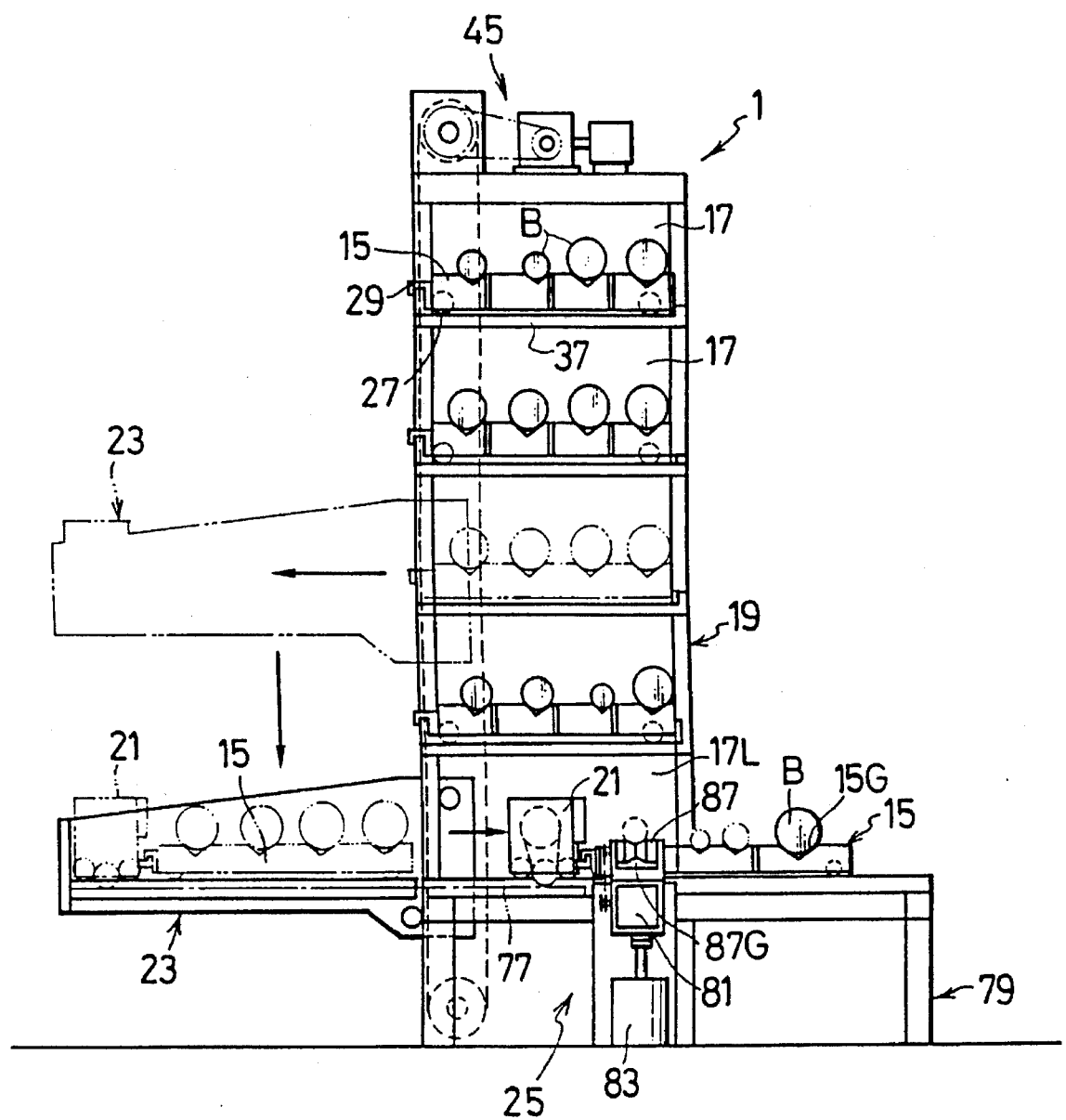
FIG. 6 is an enlarged view showing the bar supplying device of a third embodiment of the bar storage apparatus of the present invention.

With reference to FIG. 6, the third embodiment of the bar storage apparatus according to the present invention will be described hereinbelow. In this third embodiment, the axis of the bar feeding roller 87 of the bar supplying device 25 is set horizontally (without being inclined slightly as in the first embodiment), and in addition the bar feeding roller 87 is replaced with a groove roller formed with a groove 87G in the outer circumferential surface thereof. Further, the pallet 15 is also formed with V grooves 15G for stably supporting the bars B, without using the vertical partition rollers 31.

In this third embodiment, even if the diameter of the bar B changes, since the bar B can be supported stably by the circumferential grooves 87G of the bar feeding rollers 87, it is possible to feed the bar B at the central position of the bar feeding rollers 87. In addition, it is possible to simplify the construction of the pallet 15 in the number of the parts.

Figure 7:
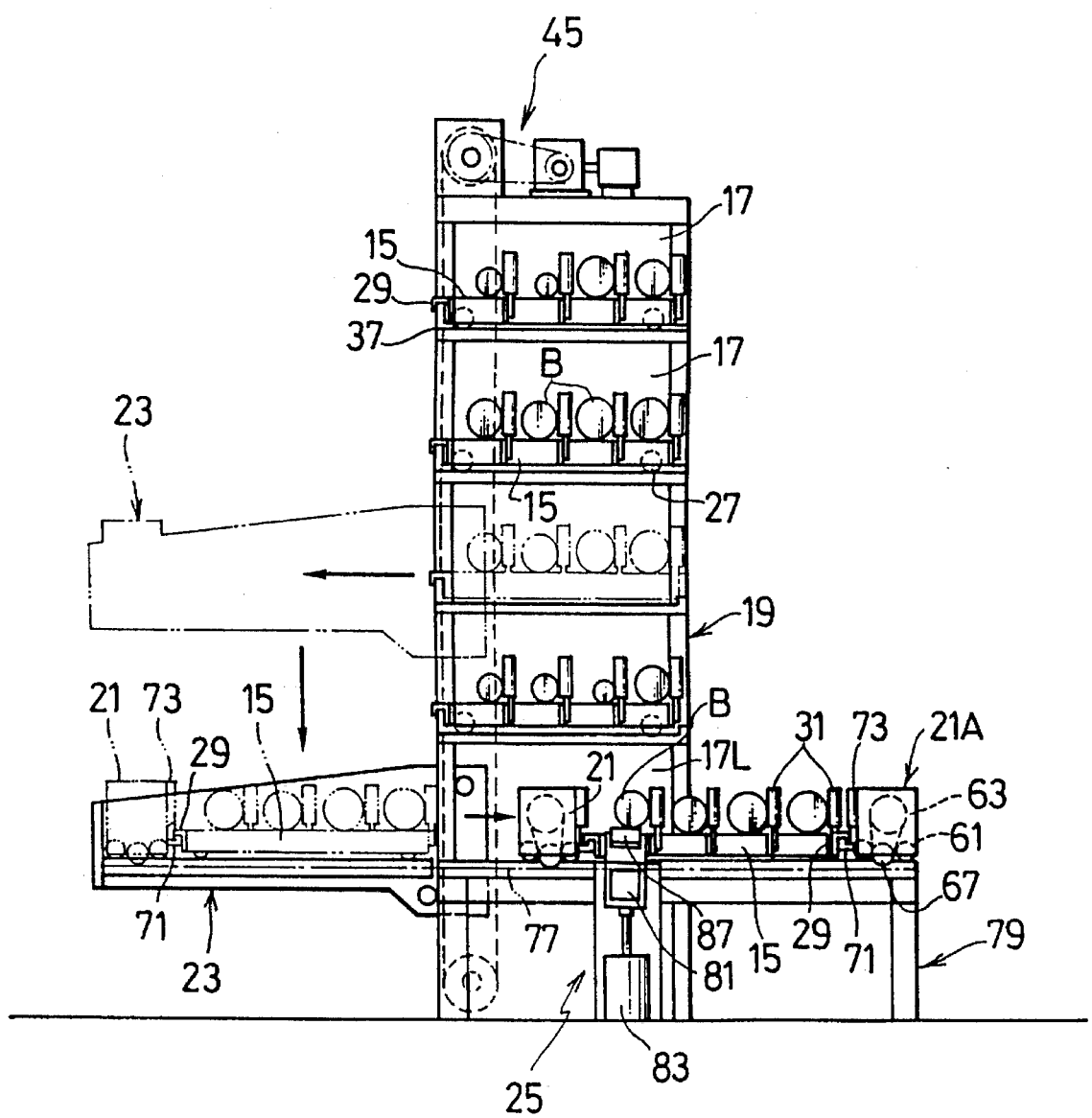
FIG. 7 is an enlarged view showing the bar supplying device of a fourth embodiment of the bar storage apparatus of the present invention.

FIG. 7 shows the fourth embodiment of the bar storage apparatus of the present invention. In this fourth embodiment, the second embodiment shown in FIG. 5 is further improved. That is, the pallet 15 is provided with two hooks 29 on both right and left sides of the pallet 15, and further a second traverser 21A is additionally provided on the pallet support table 79 so as to be freely movable to and fro in the right and left direction.

The second traverser 21A is arranged on the pallet support table 79 in symmetrical positional relationship with respect to the traverser 21 arranged on the elevator device 23. Since the function and the composing elements of the second traverser are the same as with the case of the traverser 21 of the first embodiment, the same reference numerals have been retained for the similar parts or elements, without repeating any detailed description thereof.

In the fourth embodiment, after the traverser 21 has moved the pallet 15 from the elevator device 23 to the pallet support table 79 and thereafter has been returned to the elevator device 23 (by disengaging the hook 71 of the traverser 21 from the hook 29 of the pallet 15), it is possible to further move the pallet 15 on the pallet support table 79 by the second traverser 21A in the right and left directions.

Accordingly, it is possible to use the first traverser 21 only to move the pallet 15 between one of the pallet accommodating shelves 17 and the pallet support table 79, while using the second traverser 21A only to locate the pallet 15 on the pallet support table 79 at an appropriate position corresponding to the bar processing machine 3.

In other words, two different works can be effected simultaneously by the first and second traverser 21, 21A, and therefore the working efficiency can be improved. Here, the first work is to move the elevator device 23 up and down, to pull out any required pallet 15 from the pallet accommodating shelf 17 onto the elevator device 23, to replenish the pallet 15 with new bars B, and to return the pallet 15 into the pallet accommodating shelf 17. The second work is to supply a plurality of bars B supported, through the pallet 15, on the pallet support table 79 to the bar processing machine 3.

Figure 8:
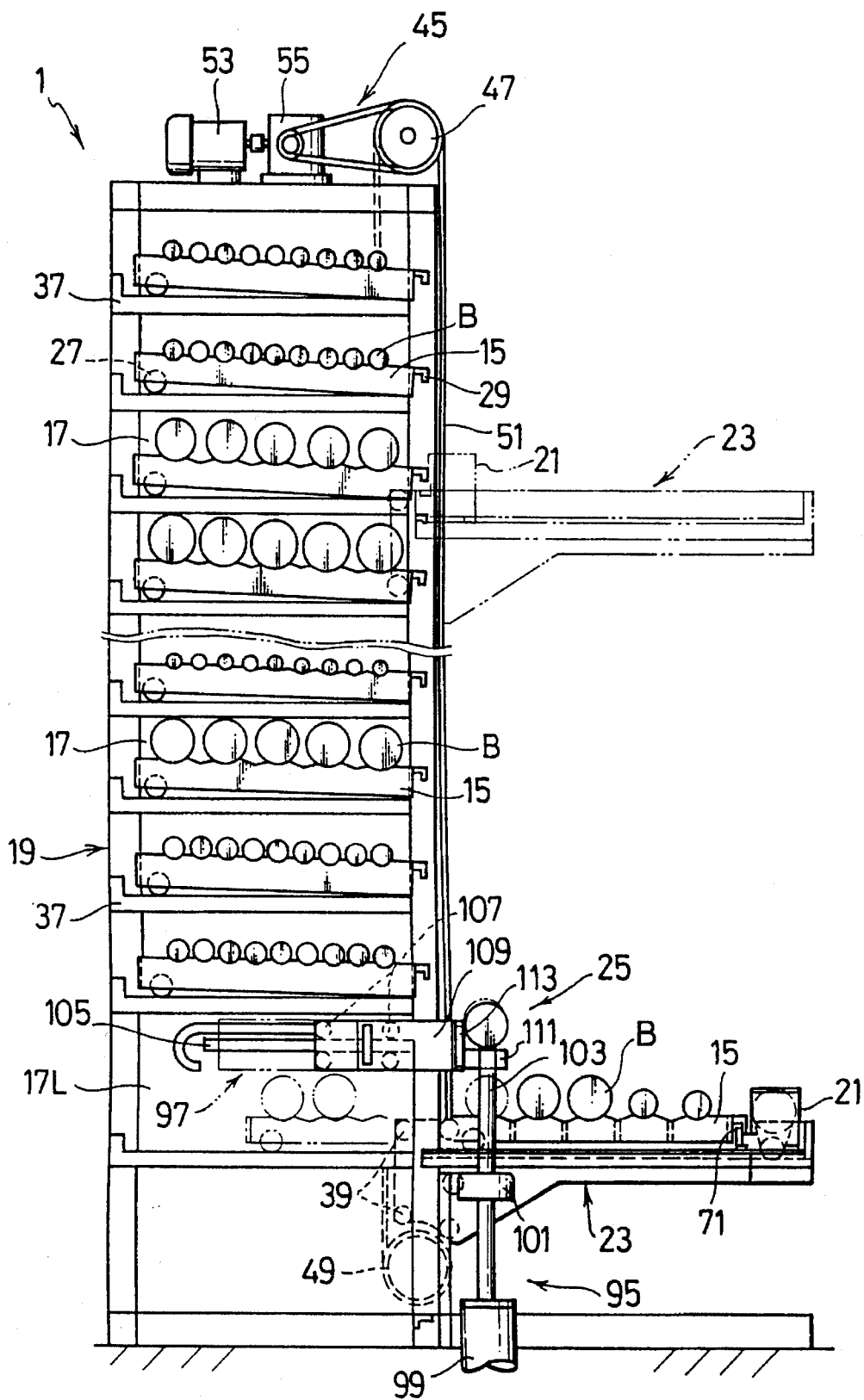
FIG. 8 is an enlarged view showing the bar supplying device of a fifth embodiment of the bar storage apparatus of the present invention.

FIG. 8 shows a fifth embodiment of the bar storage apparatus of the present invention. In this fifth embodiment, the elevator device 23 is disposed on the right side of the shelf frame 19 so as to be movable up and down. Further, the partition rollers are omitted from the pallet 15. The pallet 15 is moved to and fro by engaging its hook 29 with the hook 71 of the traverser 21 to lift the side of the pallet 15 provided with the hook 29.

Further, in this fifth embodiment, the bar supplying device 25 comprises a bar lifting device 95 for lifting the bar B from the pallet 15 on the elevator device 23, and a bar feeding device 97 for feeding the bar B in the longitudinal direction of the bar B.

In more detail, the bar lifting device 95 is composed of a plurality of lifting cylinders 99, an elongate lifting frame 101 moved up and down by the lifting cylinders 99, and a plurality of push rods 103 arranged vertically at regular intervals on the upper surface of the lifting frame 101. Further, a V-shaped groove is formed on the upper end surface of each of the push rods 103 to push up the bar B.

The bar feeding device 97 is provided with an elongate frame 109 movable in the right and left directions. This bar feeding device 97 is supported by a guide rail 105 via a plurality of guide rollers 107. The guide rail 105 is fixed to the shelf frame 19 and extended in the right and left direction.

On the right side of the movable frame 109, a plurality of horizontal support rollers 111 of cantilever type are arranged at regular intervals so as to receive or support the bar B pushed up by the push rods 103. Further, a plurality of vertical rollers 113 are also arranged at regular intervals on the right side end of the movable frame 109.

The construction of the fifth embodiment other than the above is the same as with the case of the already explained embodiments, so that the same reference numerals have been retained for the similar parts or elements which have the same functions, without repeating any detailed description thereof.

In the fifth embodiment, the pallet 15 is pulled out of any required pallet accommodating shelf 17 by the traverser 21, and moved downward to the lowermost position by the elevator device 23. Then, any required bar B on the pallet 15 is positioned over the bar lifting device 95 by the traverser 21.

Thereafter, the lifting cylinder 99 of the bar lifting device 95 is actuated to lift the lifting frame 101, so that the bar B on the pallet 15 can be pushed up by a plurality of the push rods 103.

While the bar B is being kept pushed up by the push-rods 103, the movable frame 109 of the bar feeding device 97 is shifted from the left side position to the right side as shown in FIG. 8, so that the horizontal support rollers 111 of the movable frame 109 are positioned under the bar B lifted by the bar lifting device 95.

Accordingly, when the lifting frame 101 is lowered, the lifted rod B can be supported by a plurality of the horizontal support rollers 111. Therefore, it is possible to feed and supply the bar B to the bar processing machine 3 by rotating the horizontal support rollers 111 with a motor (not shown). Further, it is possible to return the residual bar processed by the bar processing machine 3 to the pallet 15 by rotating the same motor in the reverse direction.

In this fifth embodiment, since the bar B lifted by the bar lifting device 95 is received by the bar feeding device 97 at the bar feeding position, and the received bar B is further fed by the bar feeding device 97 from the bar feeding position to the bar processing machine 3, it is possible to obtain the same effect as with the case of the fourth embodiment.

Figure 9:
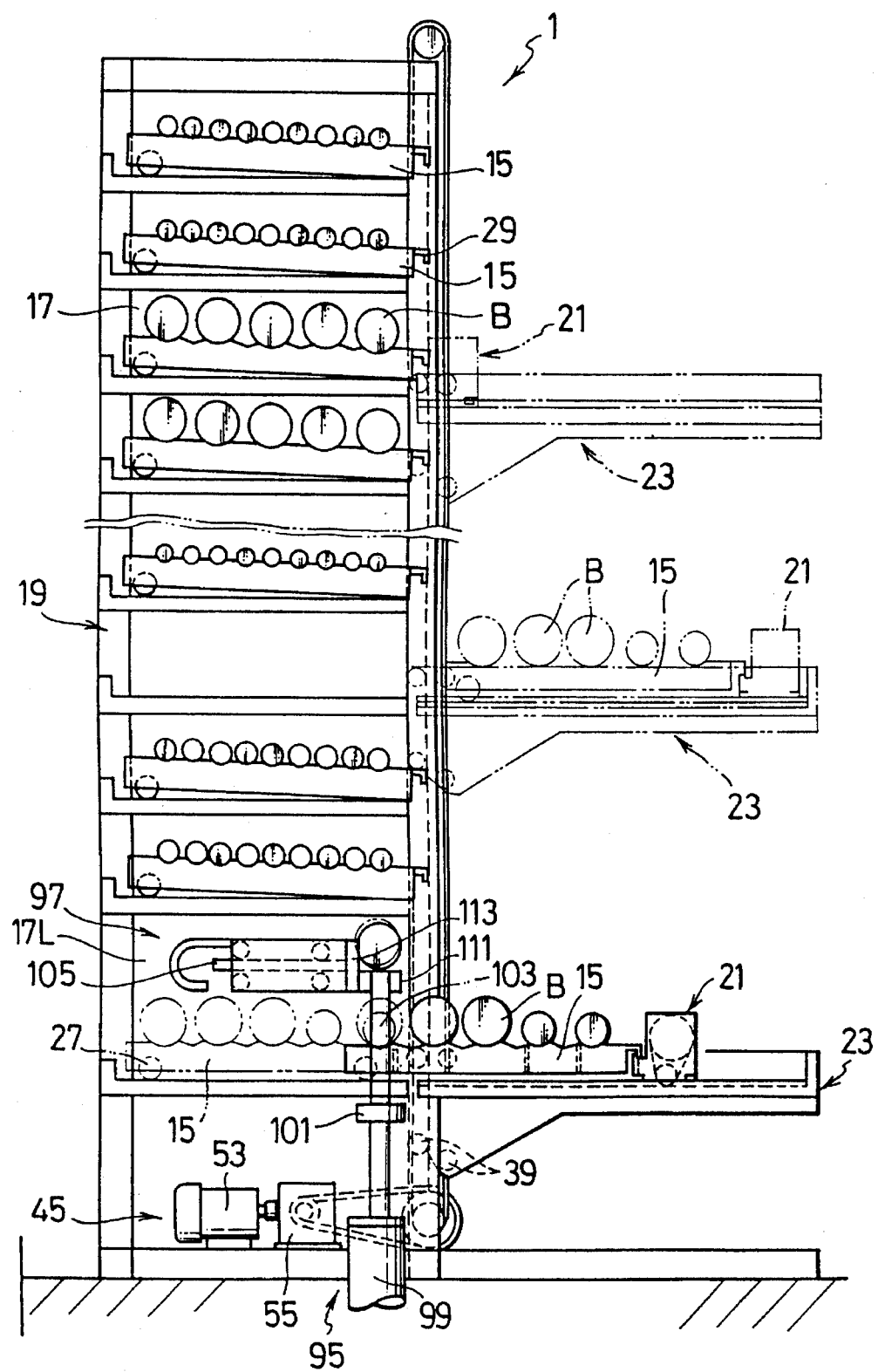
FIG. 9 is an enlarged view showing the bar supplying device of a sixth embodiment of the bar storage apparatus of the present invention.

FIG. 9 shows a sixth embodiment of the bar storage apparatus of the present invention. In this sixth embodiment, the elevator actuating device 45 is disposed on the lower portion of the shelf frame 19. Further, the bar lifting device 95 and the bar feeding device 97 are both disposed inside the shelf frame 19, respectively. The construction other than the above is the same as with the case of the fifth embodiment, so that the same reference numerals have been retained for similar parts or elements which have the same functions, without repeating any detailed description thereof.

In this sixth embodiment, the bar feeding device 97 is disposed inside the shelf frame 19; thus, after any required bar B has been moved to the bar feeding device 97 and further supplied to the bar processing machine 3, the following operation can be performed during the processing being made in the supplied bar B: to return the pallet 15 from the elevator device 23 to the original position (the pallet accommodating shelf 17) and further to prepare a new pallet 15 on the elevator device 23 or to replenish the shelf frame 19 with new bars.

Figure 10:
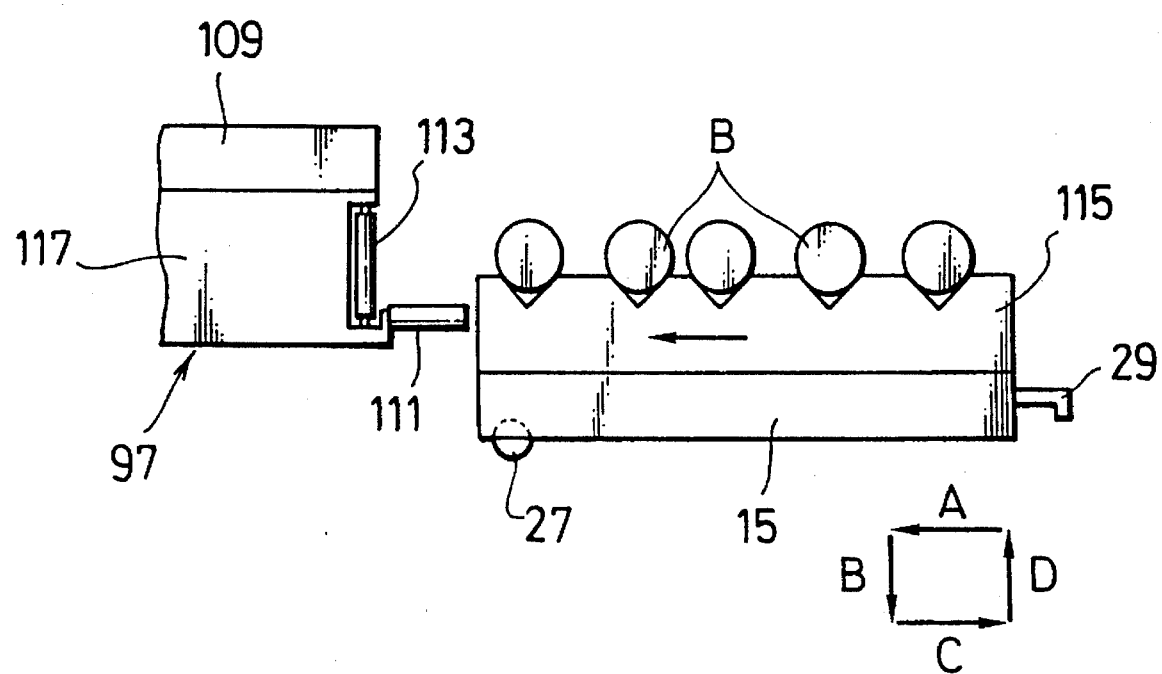
FIG. 10 is an enlarged view showing the bar supplying device of a seventh embodiment of the bar storage apparatus of the present invention.

FIG. 10 shows a seventh embodiment of the bar storage apparatus of the present invention. In this seventh embodiment, a plurality of support plates 115 for supporting the bars B is provided on the pallet 15 in such a way as to align in the longitudinal direction of the bar B and to be spaced from each other by a suitable distance. Further, a plurality of support plates 117 are arranged under the movable plate 109 in such a way as to align in the longitudinal direction of the bar B, to be spaced from each other by the suitable distance, and to be offset in horizontal position from the support plates 115 of the pallet 15. Thus the respective support plates 115 of the pallet 15 can be moved into between the two adjacent support plates 117 of the bar feeding device 97. Further, a horizontal support roller 111 and a vertical support roller are rotatably provided at the end of each of the support plates 117, respectively.

Accordingly, in this embodiment, when the pallet 15 is moved in the arrow direction A to shift the bar B onto the horizontal support rollers 111, and moved down in the arrow directions B and C, it is possible to mount the bar B directly from the pallet 115 onto the horizontal support rollers 111. Thereafter, the pallet 15 is moved up in the arrow direction D to return the original position. By repeating the above-mentioned motion, the bar B on the pallet 15 can be mounted in sequence on the horizontal support rollers 111.

Accordingly, in this seventh embodiment, when the bars B are mounted on the pallet 15 in the order of processing of the bars B, it is possible to feed or supply the bars B in sequence to the bar processing machine 3.

Figure 11:
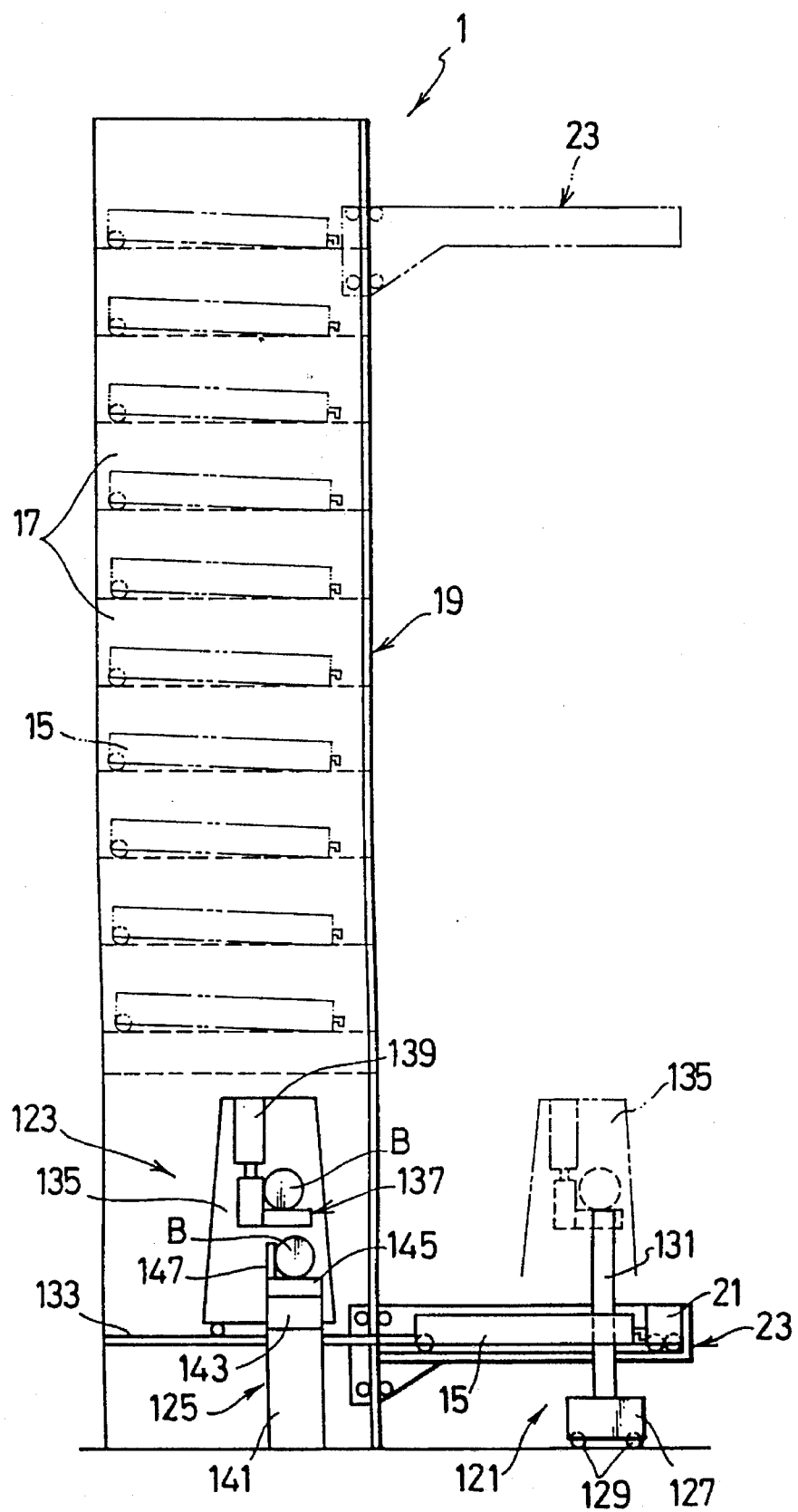
FIG. 11 is an enlarged view showing the bar supplying device of an eighth embodiment of the bar storage apparatus of the present invention.

FIG. 11 shows an eighth embodiment of the bar storage apparatus of the present Invention. In this eighth embodiment, the bar supplying device 25 is composed of a bar lifting device 121 for lifting the bar B from the pallet 15, a bar conveying device 123 for receiving the bar B lifted by the bar lifting device 121 and further conveying the received bar B in a direction perpendicular to the longitudinal direction of the bar B, and a bar feeding device 125 for feeding the bar B toward the bar processing machine 3.

In more detail, the bar lifting device 121 has an elongate movable base 127 movable in the right and left directions in FIG. 11. The movable base 127 is provided with a plurality of rollers 129 at the lower portion thereof, and a plurality of push rods 131 at the upper portion; the plurality of push rods 131 are arranged at appropriate regular intervals in the longitudinal direction of the bar B.

The bar conveying device 123 has a movable frame 135 movable along a guide rail 133 extending in the right and left directions. The movable frame 135 is provided with a fork-shaped bar receiving member 137 for receiving the bar B which is lifted by the bar push rods 131. The bar receiving member 137 can be moved up and down by a lifting cylinder 139.

The bar feeding device 125 disposed inside the shelf frame 19 is composed of a base 141, a plurality of brackets 143 arranged vertically on the base 141 at regular intervals, and a support roller 145 and a vertical roller 147 both provided at the upper portion of each of the brackets 143, respectively.

In the construction as described above, before any required pallet 15 is pulled onto the elevator device 23 and further lowered, the bar lifting device 121 is moved in the right and left direction to such a position as to correspond to the required bar B on the pallet 15.

Thereafter, when the elevator device 23 is lowered to the lowermost position, since the lifting rods 131 project beyond the upper surface of the pallet 15, the required bar B is pushed upward relative to the pallet 15. Then, the bar conveying device 123 is moved to the position of the bar lifting device 121 so that the bar receiving member 137 is moved under the bar B. Thereafter, the bar receiving member 137 is lifted by the lifting cylinder 139 to receive the bar B on the bar receiving member 137.

Thereafter, the bar conveying device 123 is returned to the position where the bar feeding device 125 is disposed. The bar receiving member 137 is lowered, so that the bar B can be mounted on the support rollers 145 of the bar feeding device 125. Therefore, it is possible to feed the bar B in the longitudinal direction toward the bar processing machine 3 by rotating the support rollers 145 of the bar feeding device 125.

In this eighth embodiment, it is possible to pull out any required pallet 15 from the pallet accommodating shelf 17 and further to supply the pulled-out bar B to the bar processing machine 3. Further, the pallet 15 can be returned to the original position (in the pallet accommodating shelf 17) while the bar B is being supplied to and processed by the bar processing machine 3. Further, it is also possible to pull out an empty pallet 15 onto the elevator device 23 for replenishment of the pallet 15 with new rods, in the same way as with the case of the afore-mentioned embodiments.

Figure 12:
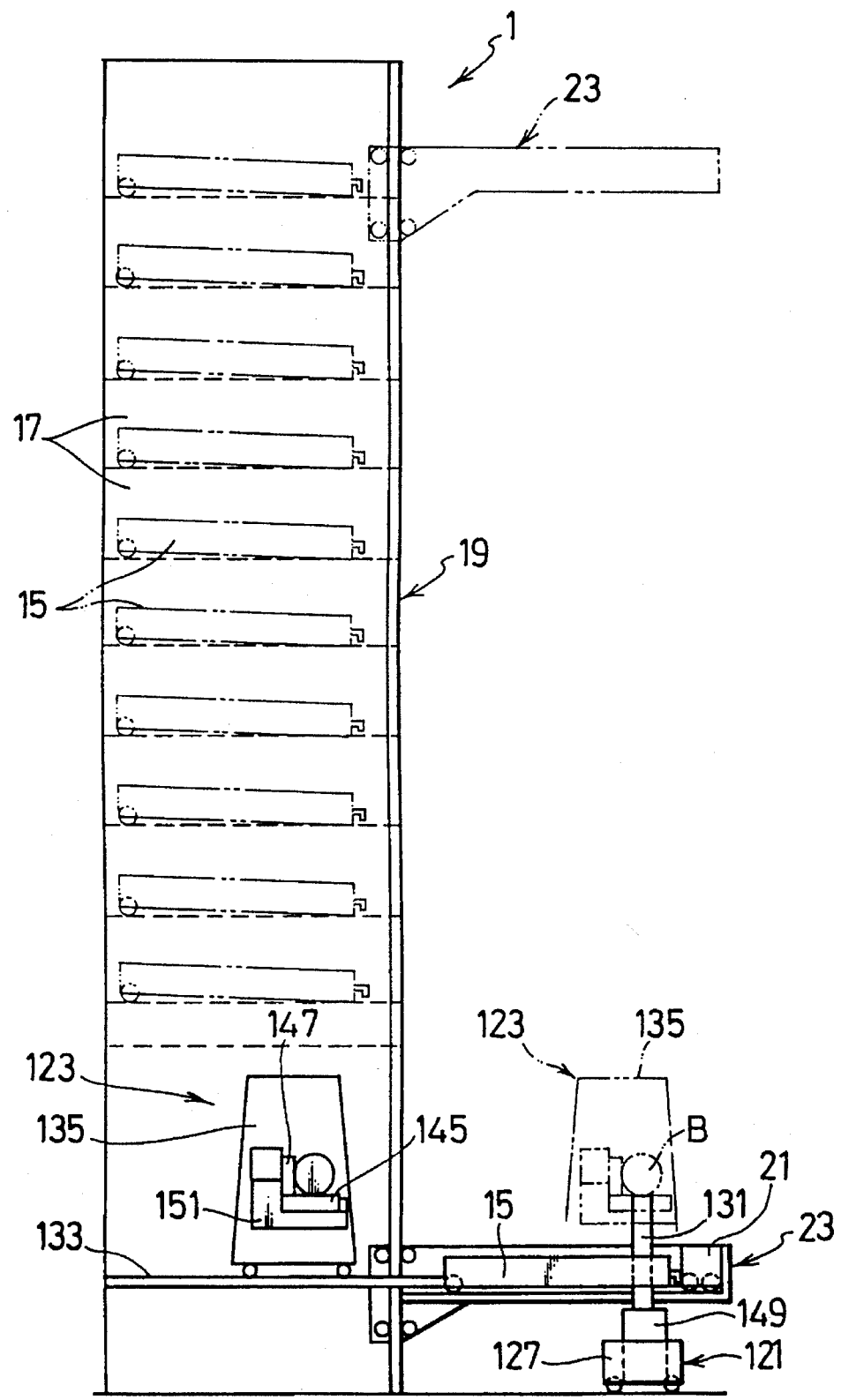
FIG. 12 is an enlarged view showing the bar supplying device of a ninth embodiment of the bar storage apparatus of the present invention.

FIG. 12 shows a ninth embodiment of the bar storage apparatus according to the present invention. In this embodiment, a lifting cylinder 149 is mounted on the movable base 127 of the bar lifting device 121 of the eighth embodiment in order to move the bar push rods 131 up and down.

Further, the bar conveying device 123 and the bar feeding device 125 of the eighth embodiment are combined and used in common. That is, the movable frame 135 of the bar conveying device 123 has a fork-shaped support member 151, and the support rollers 145 and the vertical rollers 147 are provided on the fork-shaped support member 151.

In this embodiment, after the support rollers 145 have been positioned under the bar B lifted by the push rods 131 of the bar lifting device 121, when the push rods 131 are lowered, it is possible to mount the bar B directly on the support rollers 145.

As described above, after the bar B has been supported by the support rollers 145, the movable frame 135 is shifted to and located at the original position corresponding to the bar processing machine 3. Under these conditions, when the support rollers 145 are rotated, it is possible to supply the bar B to the bar processing machine 3.

In this ninth embodiment, the construction can be simplified as compared with that of the eighth embodiment.

Figure 13:
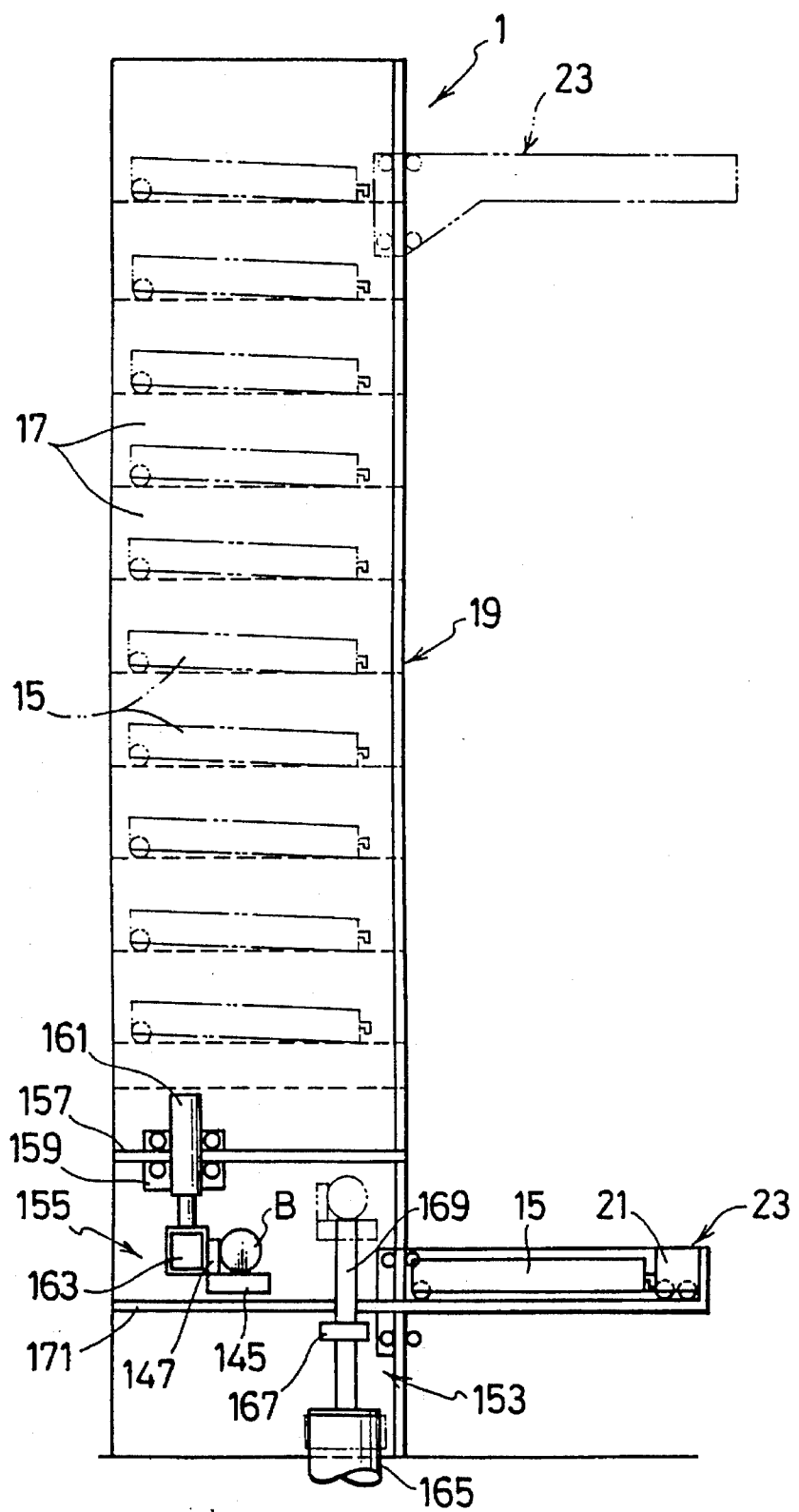
FIG. 13 is an enlarged view showing the bar supplying device of a tenth embodiment of the bar storage apparatus of the present invention.

FIG. 13 shows a tenth embodiment of the bar storage apparatus of the present invention. In this embodiment, a bar lifting device 153 is disposed at an appropriate position inside the shelf frame 19. A bar feeding device 155 is composed of a movable frame 159 movable along guide rails 157 fixed to the shelf frame 19 and extending in the right and left directions, an elongate lifting frame 163, a plurality of lifting cylinders 161 for moving the elongate lifting frame 163 up and down, and a plurality of horizontal support rollers 145 and a plurality of vertical support rollers 147 rotatably attached to the lifting frame 163, respectively.

The bar lifting device 153 is composed of an elongate lifting frame 167 moved up and down by a plurality of lifting cylinders 165 and a plurality of lifting rods 169 arranged at regular intervals on the upper surface of the lifting frame 167.

In this tenth embodiment, the pallet 15 on the elevator device 23 is moved into the shelf frame 19 along the guide rails 171, and located at such a position that a required bar B on the pallet 15 can be placed over the bar lifting device 153.

Thereafter, the required bar B on the pallet 15 is lifted by the push rods 169 of the bar lifting device 153.

Then, the movable frame 159 is moved along the guide rails 157 so that the support rollers 145 can be moved under the bar B lifted by the push rods 169, and further the bar push rod 169 is lowered to pass the bar B to the support rollers 145. Subsequently, the movable frame 159 is returned to the original position, and the lifting frame 163 is moved up and down so that the height of the support rollers 145 correspond to that of the bar processing machine 3. Thereafter, when the support rollers 145 are rotated, it is possible to feed and supply the bar B to the bar processing machine 3.

The tenth embodiment as described above is also provided with the same effects as with the case of the afore-mentioned embodiments.

Figure 14:
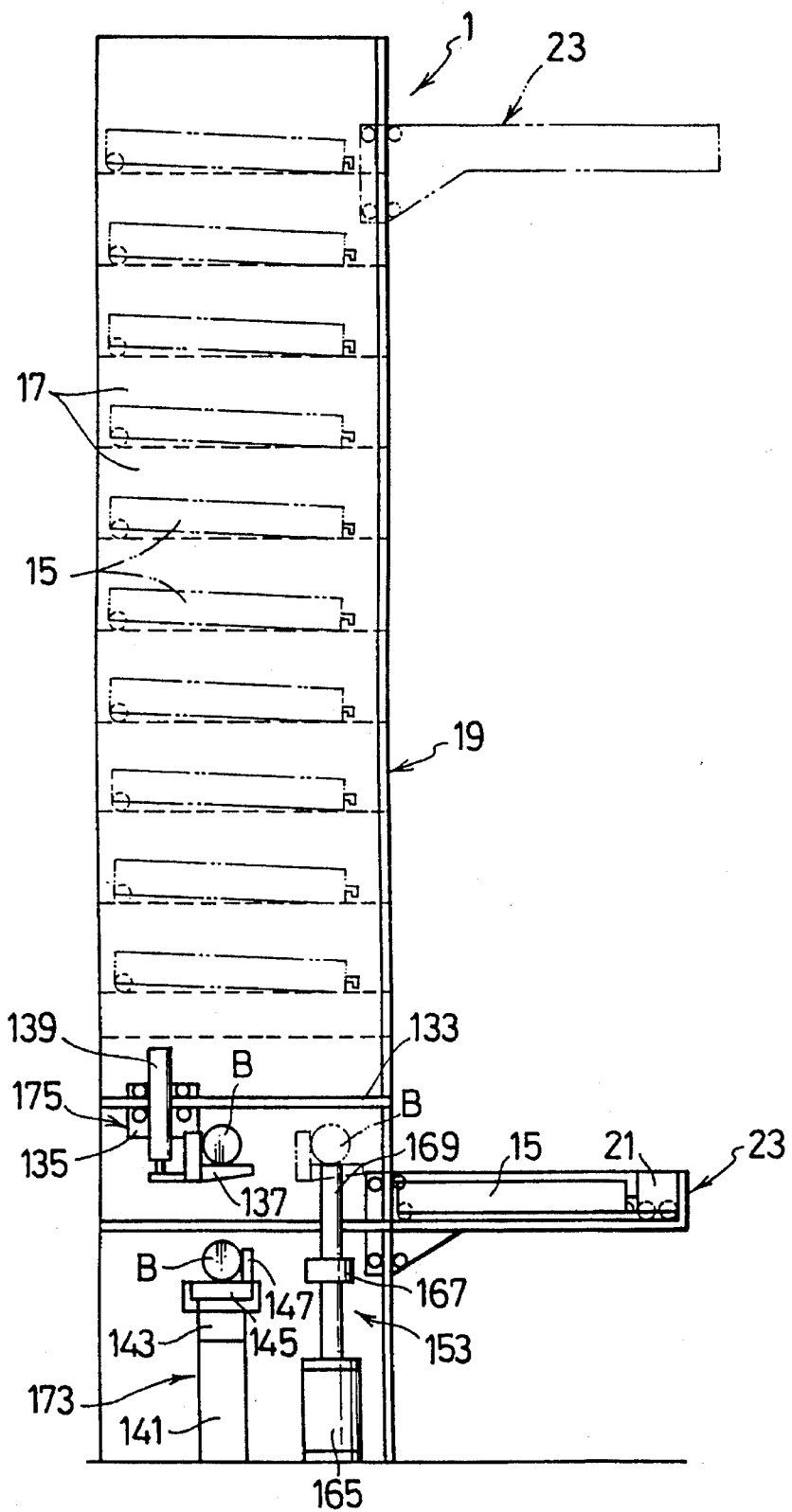
FIG. 14 is an enlarged view showing the bar supplying device of an eleventh embodiment of the bar storage apparatus of the present invention.

FIG. 14 shows an eleventh embodiment of the bar storage apparatus of the present invention. In this eleventh embodiment, the eighth embodiment shown in FIG. 11 and the tenth embodiment shown in FIG. 13 are combined with each other.

In more detail, the bar lifting device 153 and the bar feeding device 173 similar to the bar feeding device 125 of the eighth embodiment shown in FIG. 11 are both provided at appropriate positions inside the shelf frame 19. In addition, the bar conveying device 175 similar to the bar conveying device 123 in FIG. 11 is provided.

In the bar feeding device 173 and the bar conveying device 175, the same reference numerals have been retained for the similar parts or elements as with the case of the bar feeding device 125 and the bar conveying device 123, without repeating any detailed description thereof.

In this embodiment, the bar B lifted by the lifting rods 169 of the bar lifting device 153 is received by the bar receiving member 137 of the bar conveying device 175, and further shifted onto the support rollers 145 of the bar feeding device 173. This embodiment is also provided with the same effects as with the case of the afore-mentioned embodiments.

Figure 15:
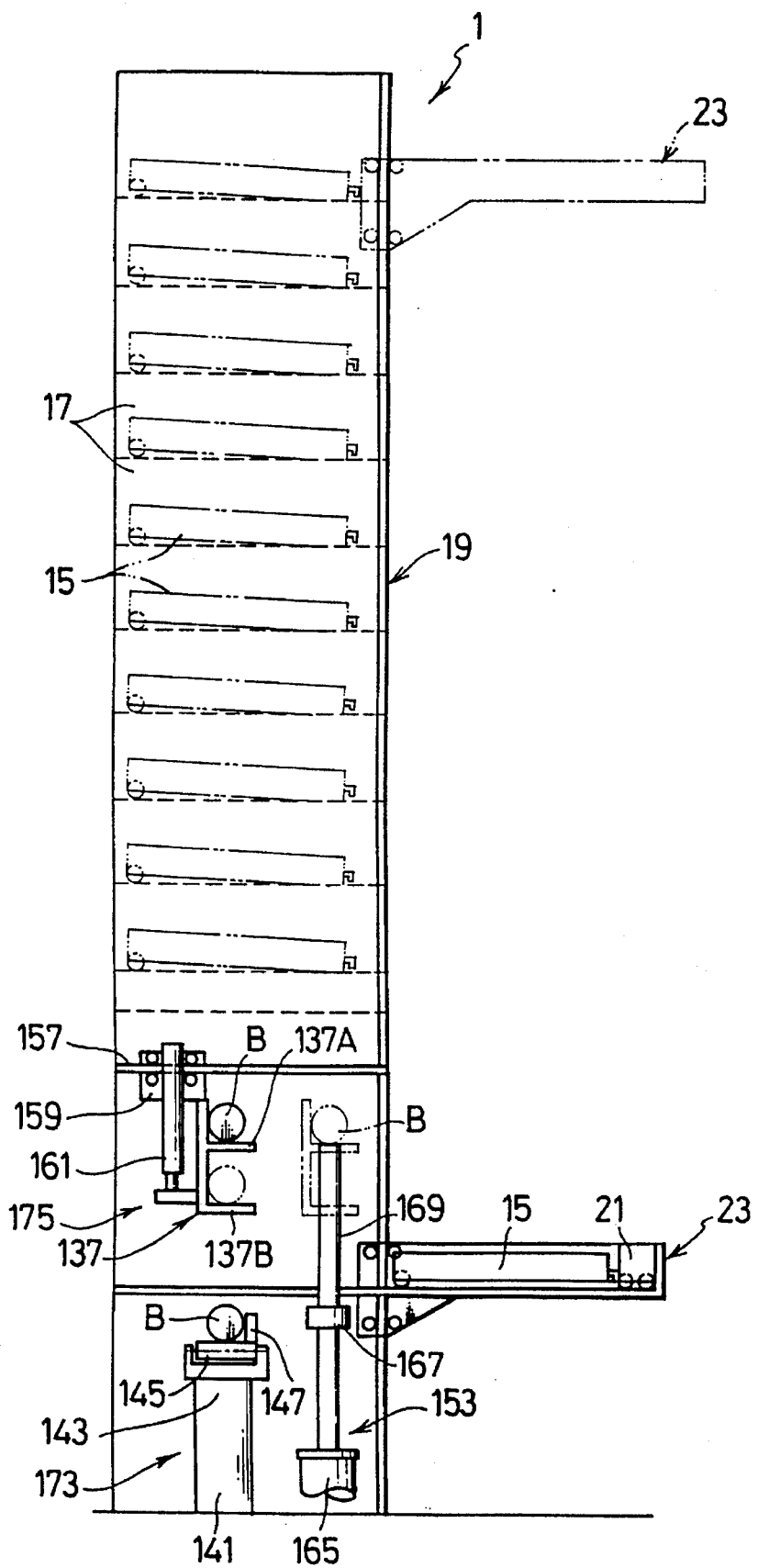
FIG. 15 is an enlarged view showing the bar supplying device of a twelfth embodiment of the bar storage apparatus of the present invention.

FIG. 15 shows an twelfth embodiment of the bar storage apparatus of the present invention. In this twelfth embodiment, the bar receiving member 137 of the bar conveying device 175 of the eleventh embodiment shown in FIG. 14 is divided into two upper and lower members (first and second bar supporting portions) 137A and 137B, respectively.

The upper side bar receiving member (the first bar supporting portion) 137A is used to supply the bar B onto the bar feeding device 173, and the lower side bar receiving member (the second bar supporting portion) 37B is used to take the residual bar from the bar feeding device 173.

In more detail, when the bar B is to be supplied to the bar feeding device 173, the bar B lifted by the push rods 169 of the bar lifting apparatus 153 is received by the upper side bar receiving member 137. Further, the bar B is mounted on the bar feeding device 173 in the same way as with the case of the eleventh embodiment shown in FIG. 14.

Here, when the bar B on the upper side bar receiving member 137A is mounted on the bar feeding device 173, if the residual bar has been already returned on the bar feeding device 173, the residual bar is first received by the lower side bar receiving member 137B and then shifted onto the push rods 169 of the bar lifting device 153.

Thereafter, the rod B on the upper side bar receiving member 137A is mounted onto the bar feeding device 173. As described above, it is possible to mount the succeeding bar B quickly onto the bar feeding device 173.

Figure 16:
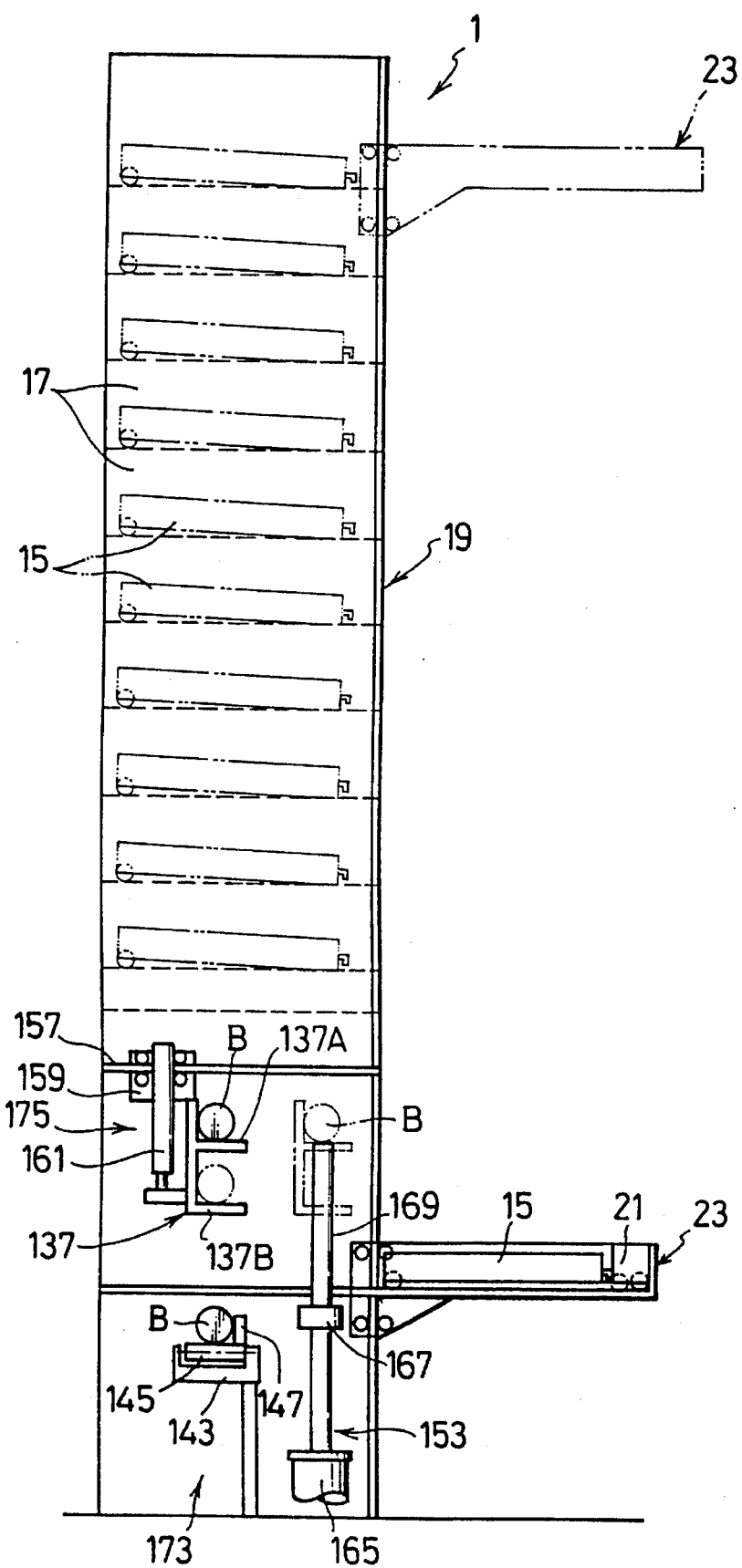
FIG. 16 is an enlarged view showing the bar supplying device of a thirteenth embodiment of the bar storage apparatus of the present invention.

FIG. 16 shows a thirteenth embodiment of the bar storage apparatus of the present invention. In this thirteenth embodiment, the support rollers 145 of the bar feeding device 73 are constructed as being of cantilever type, and the upper side bar receiving member 137A and the lower side bar receiving member 137B are separated from each other by a suitable distance for the support roller 145 supporting a bar B to be freely placed between the upper and lower side bar receiving members 137A and 137B.

In this embodiment, the support rollers 145 are of cantilever type. Thus, when the succeeding bar B is supported on the upper side bar receiving member 137A of the bar receiving member 137, for example, it is possible to receive the residual bar on the bar feeding device 173 by the lower side bar receiving member 137B. Further, thereafter it is possible to mount the bar B on the upper side bar receiving member 137A onto the support rollers 145, by moving the lower side bar receiving member 137B under the support rollers 145 while the residual bar is being kept supported on the lower side bar receiving member 137B.

In this embodiment, before the residual bar is returned onto the pallet 15, the succeeding bar B can be mounted on the bar feeding device 173, so that it is possible to convey the bar B onto and from the bar feeding device 173 more quickly.

In the afore-mentioned embodiments, it is assumed that bars B including residual ones are arranged on the pallet 15 in parallel to each other. However, in this arrangement, when the shortened residual bars are returned to and arranged on the pallet 15 in parallel to each other, the pallet availability is not high. To overcome this problem, it is possible to mount a plurality of the shortened residual bars in series on the pallet 15.

In order to mount and arrange a plurality of residual bars on the pallet 15 in series and further the mounted residual bars can be supplied again to the bar processing machine 3, it is possible to move up and down each or a group of the bar push rods of the bar lifting device independently or separately in the respective embodiments as shown in FIGS. 11 to 16, respectively.

With the bar lifting device constructed as described above, it is possible to selectively lift a required residual bar from a plurality of residuals on the pallet, by the push rods corresponding to the required residual bar, and thereby the pallet 15 can be used more effectively.

As described above, in the bar storage apparatus of the present invention, it is possible to pull out any required pallet 15 from the pallet accommodating shelf 17, and to supply any required bar B mounted on the pallet 15 to the bar processing machine 3 automatically. Thus, a great number of bars B of various kinds and dimensions can be stored previously, and further any required bars can be selectively supplied to the bar processing machine 3 easily; this in turn enables the bar processing to be automatized and the labor required for bar processing to be saved.

What is claimed is:

1. A bar storage apparatus for supplying bars to a bar processing machine, comprising:

a shelf frame having a plurality of pallet accommodating shelves arranged vertically;

an elevator device disposed on one side of said shelf frame so as to be movable up and down, the shelves and the elevator device accommodating pallets;

a traverser for moving a pallet between the pallet accommodating shelf and the elevator device, and between the elevator device and a predetermined position;

a bar lifting device for lifting the bar upwardly from a position of the pallet located at the predetermined position;

a bar conveying device for receiving the bar from the bar lifting device and conveying the received bar in a lateral direction of the bar; and a bar feeding device for receiving the bar from the bar conveying device and feeding the received bar in a longitudinal direction of the bar.

2. The bar storage apparatus according to claim 1, wherein said bar conveying device (175) includes a first bar supporting portion (137A) for supporting a first bar (B), and a second bar supporting portion (137B) for supporting a second bar (B).

3. The bar storage apparatus according to claim 2, wherein the pallet (15) has a lattice structure.

4. The bar storage apparatus according to claim 1, wherein the pallet (15) has a lattice structure.

5. The bar storage apparatus of claim 4, wherein the pallet (15) is formed with grooves (15G) each for stably supporting the bar (B).

6. The bar storage apparatus of claim 1, wherein the bar feeding device (173) is provided with a plurality of feeding rollers (145) of cantilever type, and the first bar supporting portion (137A) and the second bar supporting portion (137B) are separated from each other by a suitable distance so that the feeding roller (145) supporting a bar (B) is freely placed between the first and second bar supporting portions (137A, 137B).

* * * * *